United States Patent [19]
Parry et al.

[11] Patent Number: 5,983,943
[45] Date of Patent: Nov. 16, 1999

[54] FLUIDIC OSCILLATOR COMPRISING AN OBSTACLE WITH AN IMPROVED PROFILE

[75] Inventors: Andrew John Parry, Bourg la Reine, France; Philippe Hocquet, Oslo, Norway

[73] Assignee: Schlumberger Industries, S.A., Montrouge, France

[21] Appl. No.: 09/152,700

[22] Filed: Sep. 11, 1998

[51] Int. Cl.$^6$ .................................................. G01F 1/20
[52] U.S. Cl. ........................ 137/826; 137/833; 137/842
[58] Field of Search ................................ 137/842, 833, 137/826

[56] References Cited

U.S. PATENT DOCUMENTS

| | | | |
|---|---|---|---|
| Re. 33,448 | 11/1990 | Banner | 137/833 |
| 3,640,133 | 2/1972 | Adams | 137/842 |
| 3,785,390 | 1/1974 | Taylor | 137/74 |
| 3,973,442 | 8/1976 | Hunter et al. | 137/824 |
| 4,854,176 | 8/1989 | Okabayashi | 137/833 |
| 5,363,704 | 11/1994 | Huang | 137/842 |
| 5,396,808 | 3/1995 | Huang et al. | 137/883 |
| 5,638,867 | 6/1997 | Huang | 137/842 |

*Primary Examiner*—A. Michael Chambers
*Attorney, Agent, or Firm*—Leonard W. Pojunas

[57] ABSTRACT

The invention relates to a fluidic oscillator which is symmetrical with respective to a longitudinal symmetry plane, comprising a fluid inlet intended to form a bidimensional fluid jet which oscillates transversally with respective to the symmetry plane, an obstacle wherein is arranged a cavity which faces said fluid inlet and which is scavenged by the oscillation jet, characterized in that the obstacle has a front wall which has two so-called front surfaces substantially planar and framing the cavity, the plane of each surface being substantially perpendicular to the symmetry plane, said cavity being defined by a surface which is substantially parallel to said plane at the points where said surface joins each of said front surfaces, the obstacle also having two side walls of which said side surfaces are substantially parallel to the symmetry plane at the points where each of them joins the corresponding front surface.

13 Claims, 7 Drawing Sheets

FLUIDIC OSCILLATOR COMPRISING AN OBSTACLE WITH AN IMPROVED PROFILE

The invention concerns a fluidic oscillator which is symmetrical with respect to a longitudinal symmetry plane and which includes a fluid inlet intended to form a bidimensional fluid jet oscillating transversally with respect to said plane, an obstacle having a front wall in which a cavity is made and situated opposite said fluid inlet and which is scavenged by the oscillation jet.

Figure 1:
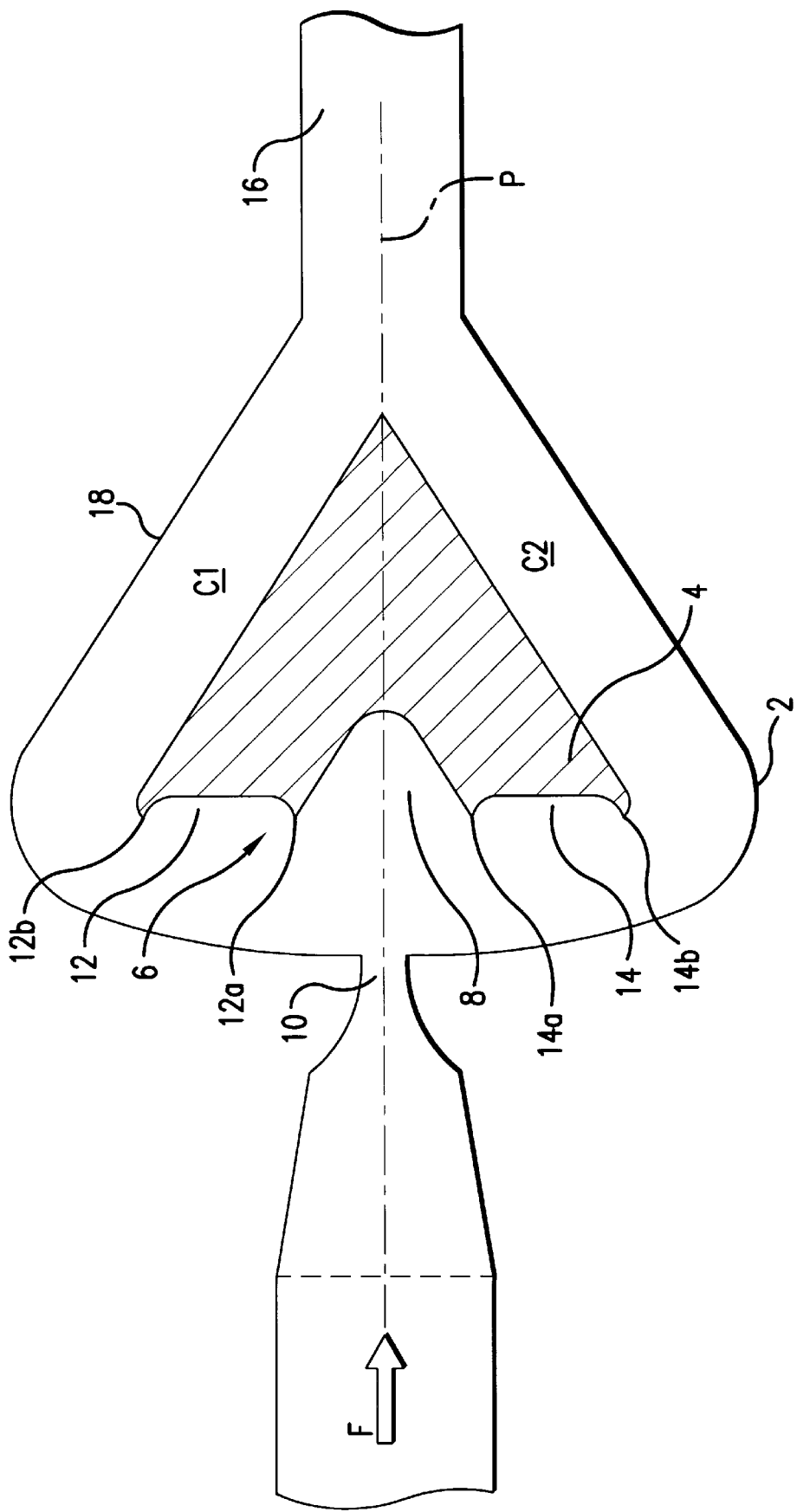

The document FR 2690717 describes a fluidic oscillator of this type and shown at the top on FIG. 1.

This oscillator 1 includes an oscillation chamber 2 and an obstacle 4 housed inside said chamber. The obstacle 4 has a front wall 6 in which a main cavity 8 is made and situated opposite an aperture 10.

The aperture 10 defines a fluid intake in the oscillation chamber 2 and is intended to form a bidimensional fluid jet which oscillates transversally with respect to the longitudinal symmetry plane P.

The fluid jet alternately scavenges the main cavity 8 when it is oscillating.

The obstacle 4 also has in its frontal portion 6 two secondary cavities 12 and 14 situated on both sides of the main cavity 8. These secondary cavities 12 and 14 are disposed opposite the front walls of the oscillation chamber which frame the aperture 10 and are delimited by point-shaped elements 12a, 12b and 14a and 14b.

The shape of the portion of the main cavity most distant from the aperture is round and on approaching the aperture, the edges of said cavity widen out (FIG. 1).

When the fluid jet meets the main cavity and scavenges it, eddies are formed on each side of the jet and are alternately strong and weak in phase opposition and in relation to the oscillation of said jet.

These eddies deform during oscillation of the jet and the purpose of the secondary cavities 12 and 14 is to render the radial extension of the eddies dependent on the jet flow control, the radial extension being the distance between the centre of the eddy in question and its perimeter.

Together with the lateral walls of the oscillation chamber, the obstacle 4 defines two channels C1 and C2 which enable the fluid to flow downstream of the fluidic oscillator in the direction of an outlet 16.

Figure 2:
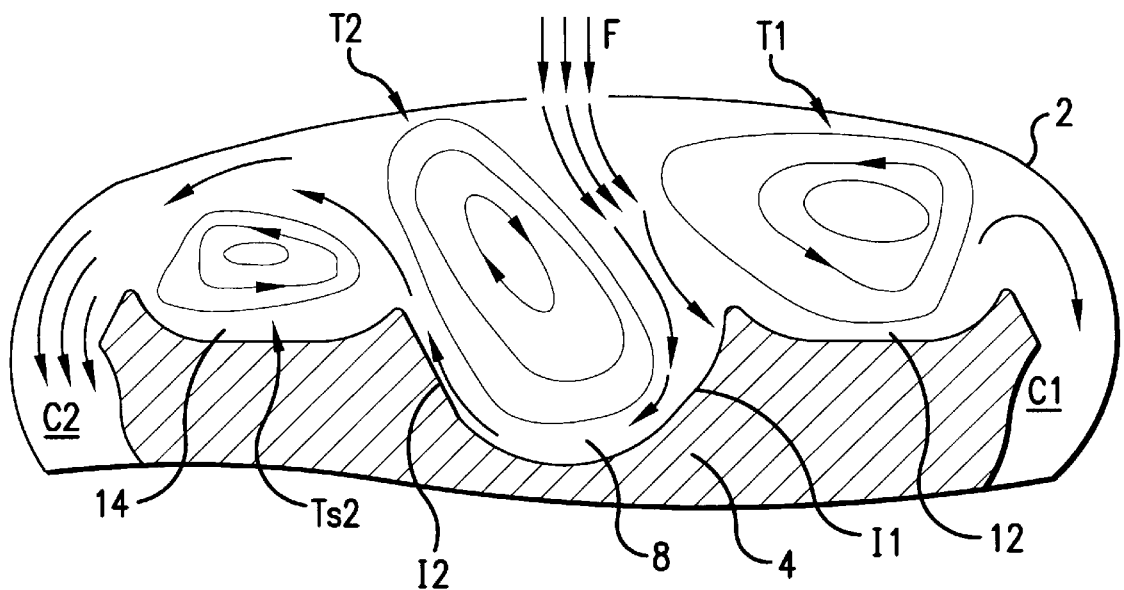
Figure 3:
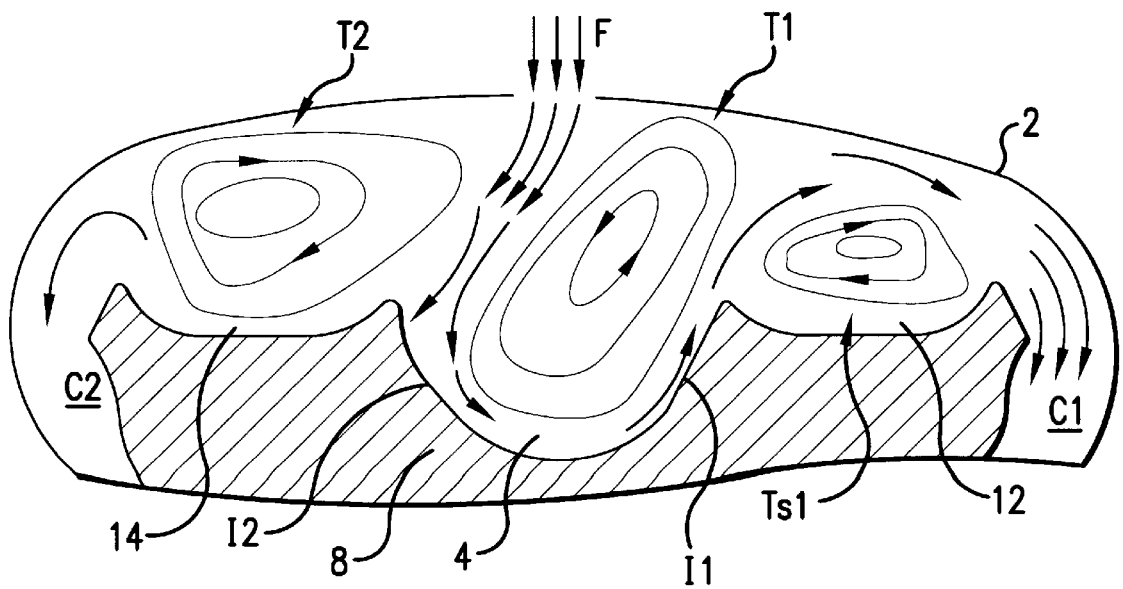

The following description concerns the general functioning of the fluidic oscillator in a transition state with reference to FIGS. 2 and 3.

The impact of the fluid jet F scavenges the main cavity 8 between the extreme points I1 and I2. Oscillation is accompanied by the formation of principal eddies T1 and T2 localised between the front portion 6 of the obstacle 4 and the walls of the oscillation chamber 2 connected to the aperture 10.

On FIG. 2, the impact of the jet strikes the point I1, the eddy T1 then being concentrated and strong, whereas the eddy T2 is weak. The fluid jet mainly escapes via the channel C2.

In a turbulent state, the two secondary cavities 12 and 14 are filled by secondary eddies Ts1 and Ts2, alternately strong and weak in phase opposition with the main eddies. But the more the flow reduces, the more the intensity or concentration of these secondary eddies reduces.

As a result, the radial extension of the main strong eddy (T1 on FIG. 2) increases so that when the flow is reduced, it progressively occupies the secondary cavity 12 to the detriment of the secondary eddy Ts1 which finishes by disappearing completely.

On the other hand, the secondary eddy Ts2 created by the escape of the fluid jet is still present inside the secondary cavity 14.

On FIG. 3, the impact of the fluid jet is situated at 12 and here it is the eddy T2 which has an increased radial extension, the secondary eddy Ts2 disappearing completely when the flow is sufficiently lowered. The main eddies, when they are concentrated and strong, have a larger radial extension in the transition state than the one they have in the turbulent state (since in this latter state the secondary cavities are both occupied by secondary eddies, the space available for the development of the main eddies is reduced). The oscillation frequency is much weaker when the radial extension of the main strong eddies is large.

Thus, this fluidic oscillator has with respect to previously known fluidic oscillators an oscillation frequency increased in a turbulent flow state and a reduced frequency in a transition state and thus improved linearity.

However, this fluidic oscillator does have problems of repeatability of the measurements owing to the presence of point-shaped elements 12a, 12b, 14a and 14b.

In fact, during production it is difficult to constantly accurately reproduce the secondary cavities and the discrepancies obtained from one fluidic oscillator to another have resulted in calibration curves whose linearity has proved to be inadequate for the envisaged applications.

The present invention seeks to resolve this problem by offering a fluidic oscillator whose performances remain approximately the same as those of the oscillator described in the document FR. 2690717.

Thus, the present invention concerns a fluidic oscillator which is symmetrical with respect to a longitudinal symmetry plane and includes a fluid inlet intended to form a bidimensional fluid jet oscillating transversally with respect to the symmetry plane, an obstacle in which a cavity is made and situated opposite said fluid inlet and which is scavenged by the oscillation jet, characterised in that the obstacle has a front wall including two mainly flat front surfaces framing the cavity, the plane of each surface being approximately perpendicular to the symmetry plane, said cavity being defined by a surface approximately parallel to said symmetry plane at points where said surface joins each of said front surfaces, the obstacle also having two lateral walls whose lateral surfaces are approximately parallel to the symmetry plane at points where each of them joins the corresponding front surface.

The new simplified configuration of the fluidic oscillator of the invention makes it possible to obtain main eddies whose radial extension (distance between the centre of the eddy and its periphery) increase with the Reynold's number, thus contributing in reducing the oscillation frequency of the jet.

In this way, the performances of the new fluidic oscillator are approximately the same as those of the oscillator of the prior art described in the patent FR 2 690 717.

The configuration of this fluidic oscillator enables the eddies to develop more freely than in the oscillator of the prior art where the secondary cavities impose geometrical stresses on the eddies according to the jet flow rate.

In the fluidic oscillator of the prior art as regards turbulent and steady flows, the secondary cavities are both occupied by secondary eddies in addition to the presence of the main eddies, whereas in the oscillator of the present invention, only the main eddies occupy the space situated between the front portion of the obstacle and the fluid inlet.

In the fluidic oscillator of the prior art, in the transition state the size of the main eddies is increased with respect to that of the same eddies in the turbulent and steady states.

The fact of having suppressed the secondary cavities and thus the point-shaped elements delimiting said cavities renders it much easier to produce the fluidic oscillator and reproduce it with constant accuracy.

According to one characteristic of the invention, the surface of the cavity is profiled so as to guide the fluid jet into said cavity and prevent the creation of a recirculation phenomenon inside the latter which would risk disturbing oscillation of the jet.

According to a further characteristic of the invention, the fluidic oscillator includes an oscillation chamber connected to the fluid inlet and housing the obstacle. The oscillation chamber has walls situated opposite front surfaces on both sides of the fluid inlet and whose surfaces are approximately parallel to said front surfaces.

This characteristic also contributes in controlling the size of the eddies.

According to a further characteristic of the invention, the obstacle has a rear wall defined by a rear surface approximately perpendicular to the longitudinal symmetry plane P.

Figure 4:
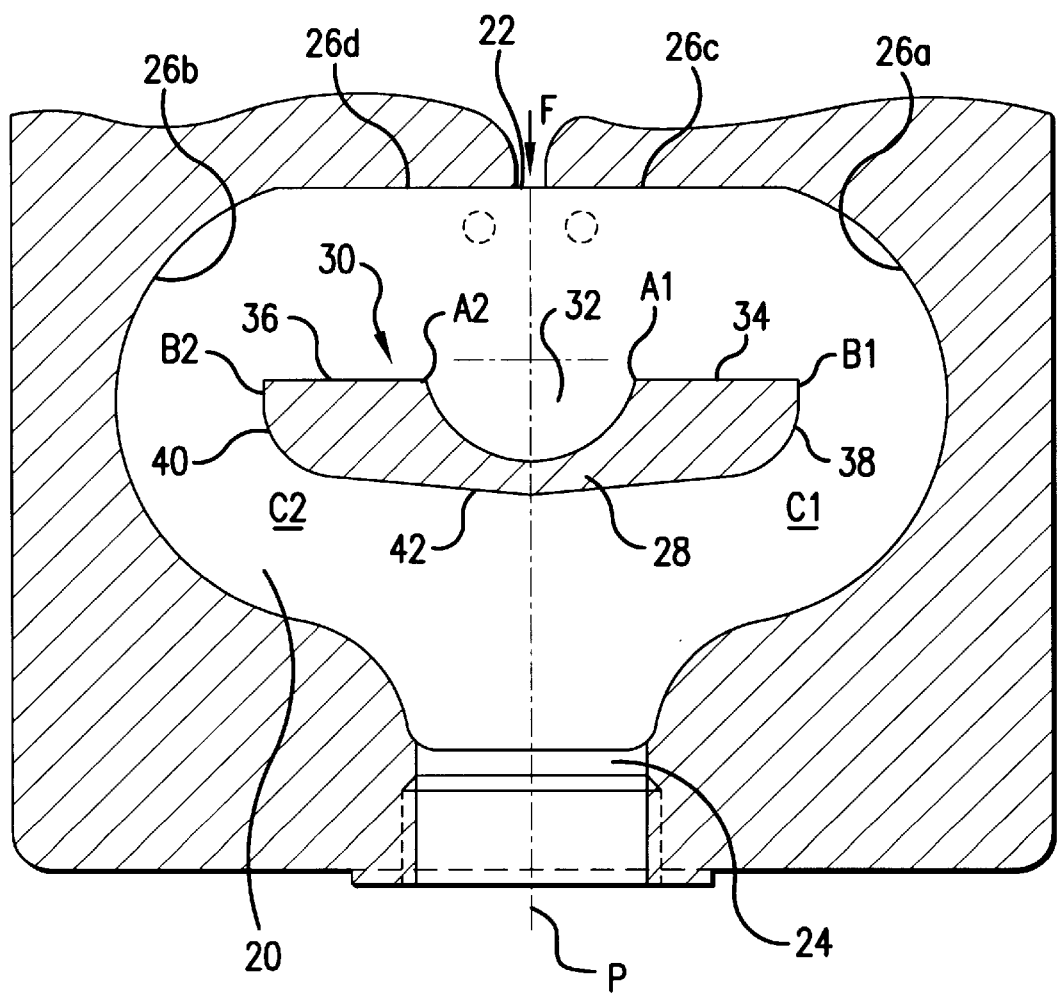
Figure 5A:
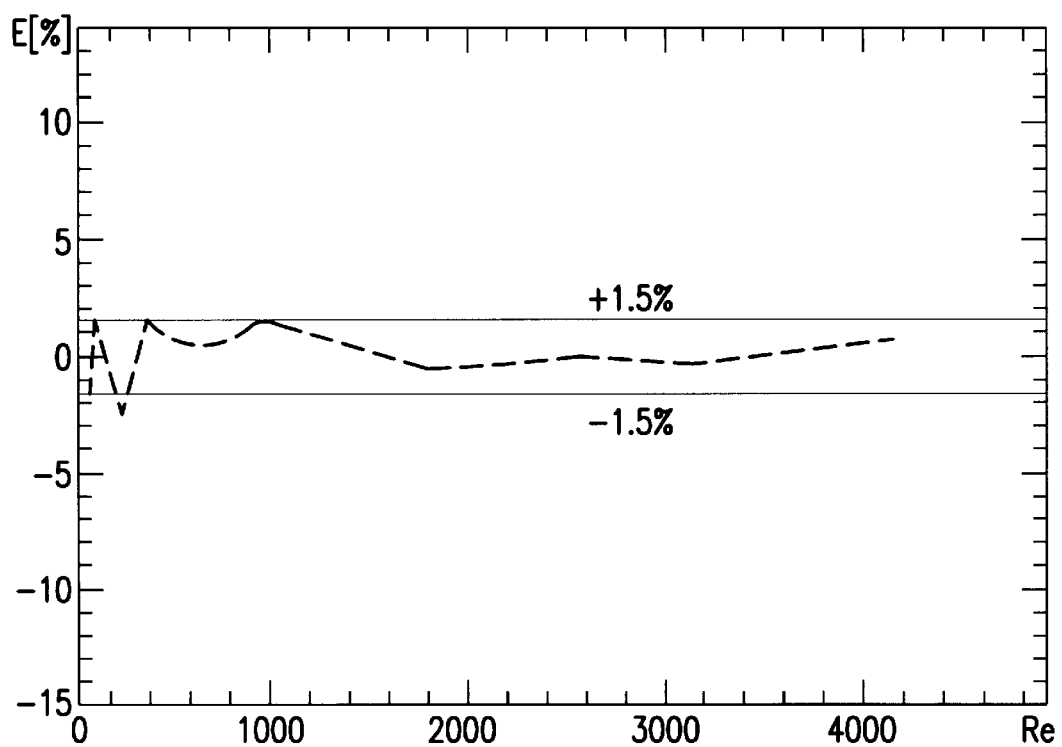
Figure 5B:
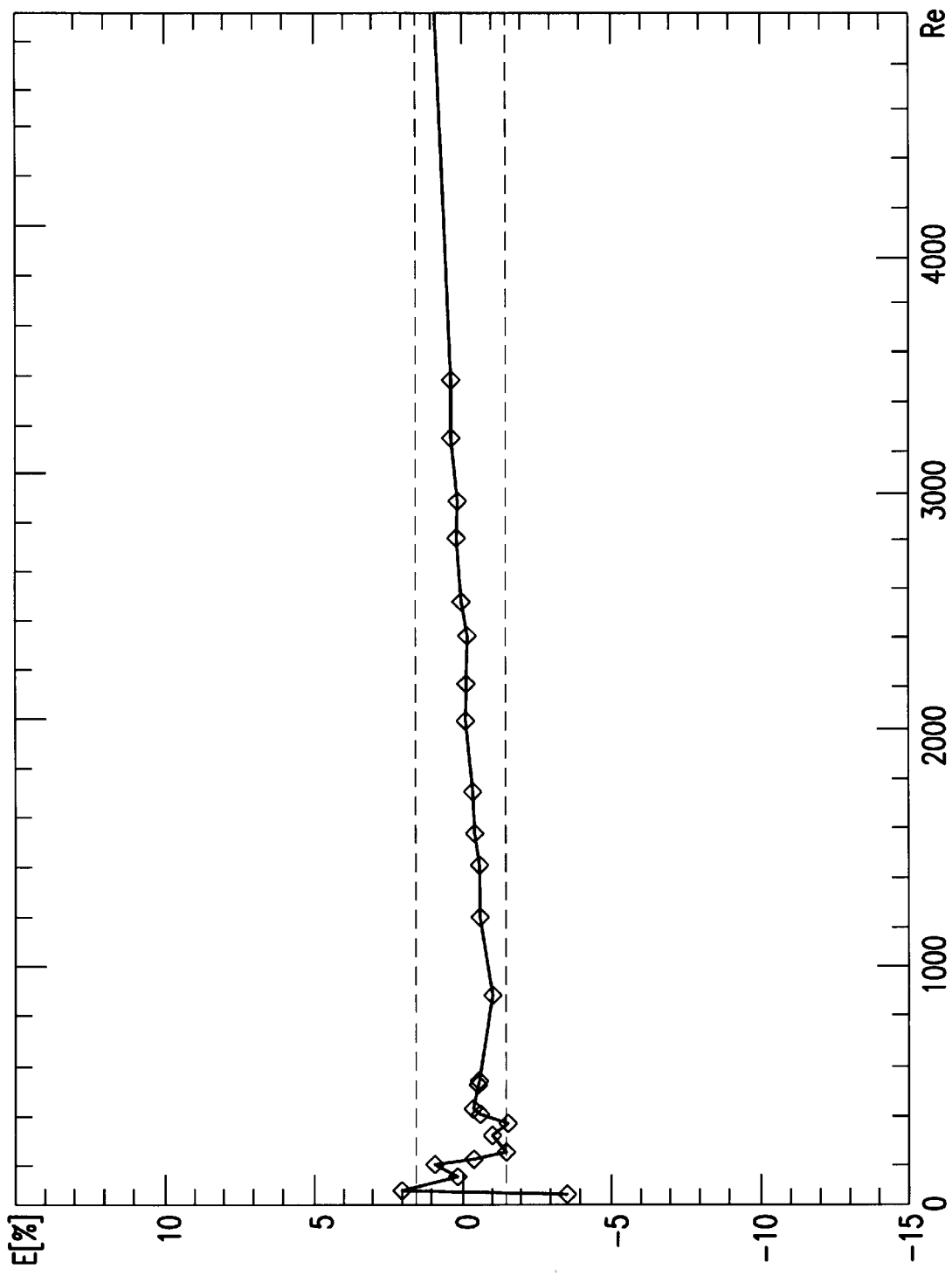
Figure 6A:
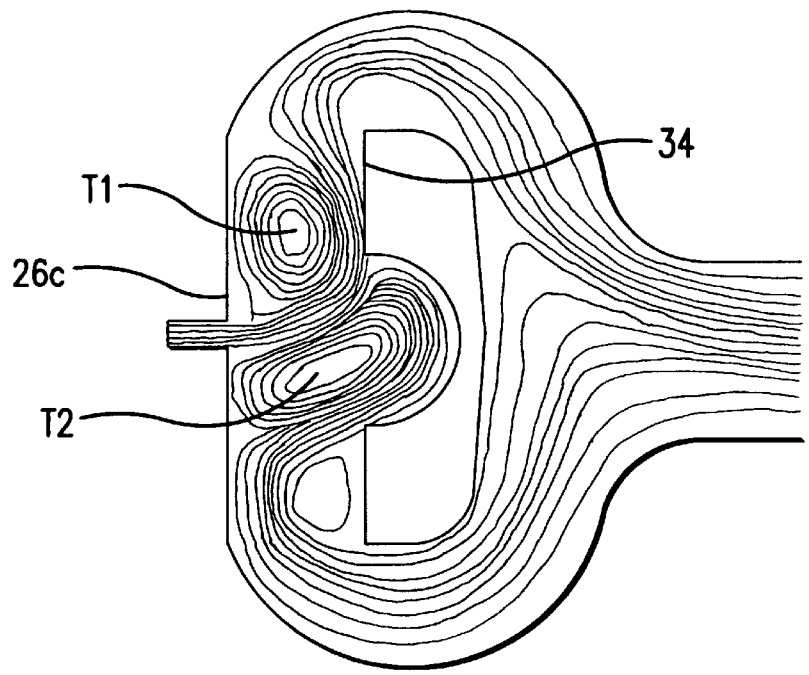
Figure 6B:
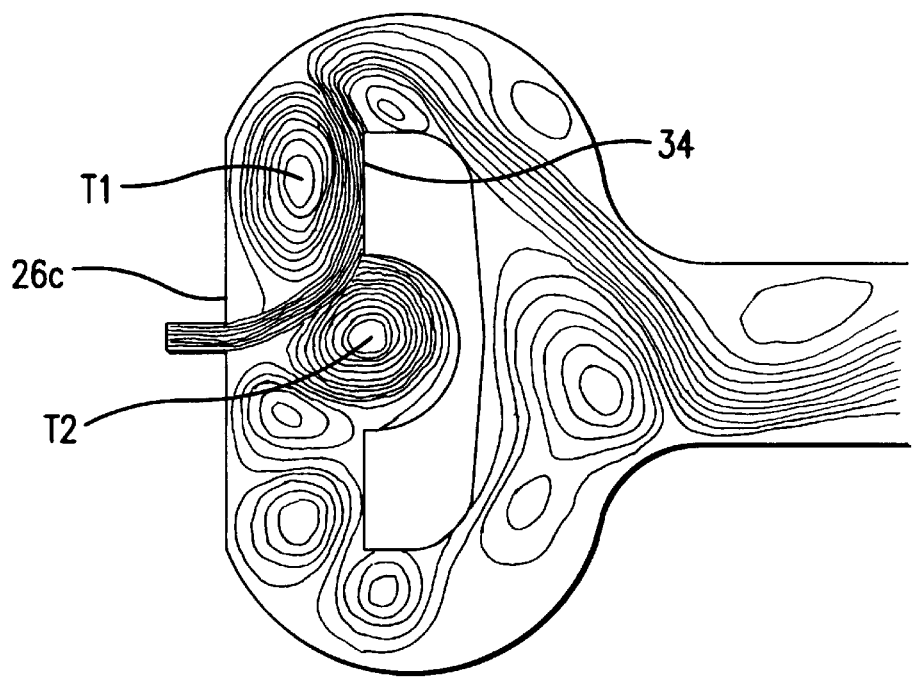
Figure 6C:
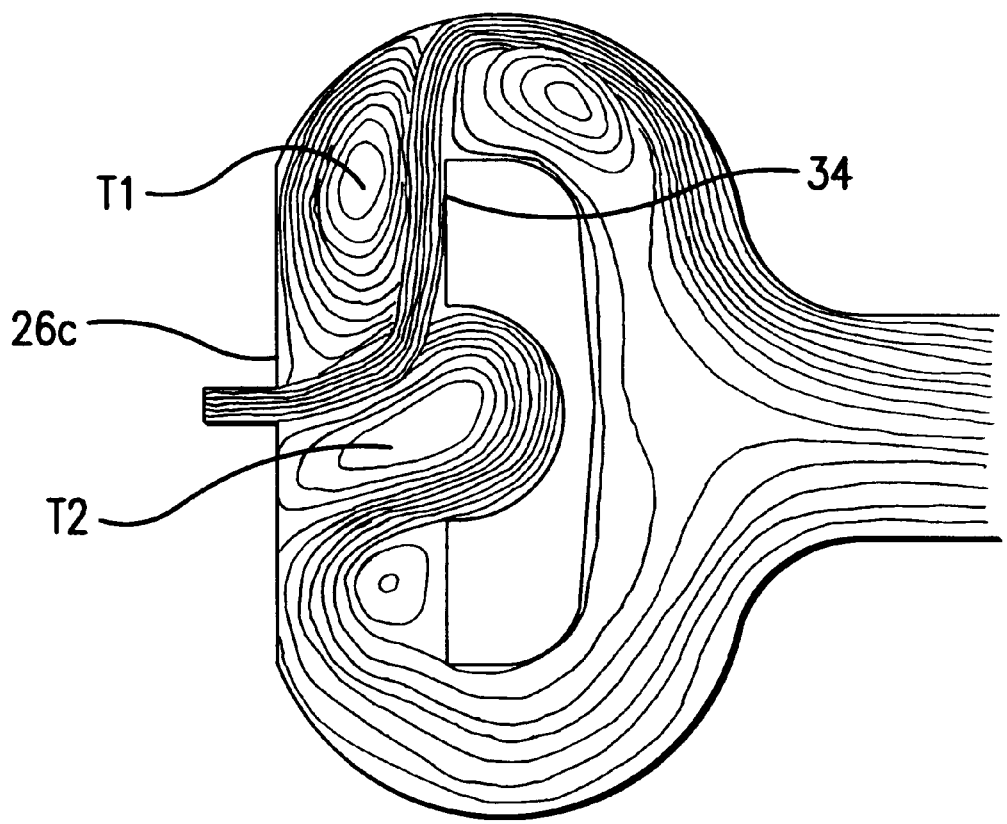

Other characteristics and advantages shall appear more readily from a reading of the following description, given solely by way of example and with reference to the accompanying drawings on which:

FIG. 1 is a top view of a fluidic oscillator of the prior art,

FIG. 2 and 3 diagrammatically represent a partial top view of the fluidic oscillator shown on FIG. 1 and operating in a transition state at two separate moments, FIG. 4 is a top view of a fluidic oscillator according to one embodiment of the invention, FIGS. 5a and 5b represent the calibration curves obtained for the fluidic oscillator of the prior art and that of the present invention, FIGS. 6a, 6b and 6c diagrammatically represent a partial top view of the fluidic oscillator shown on FIG. 4 and functioning for steady, transition and turbulent flow states.

As shown on FIG. 4 and denoted by the general reference number 20, a fluidic oscillator is used in relation to a gas flow so as to determine the flow and volume of the gas which has traversed said oscillator.

The fluidic oscillator 20 is symmetrical with respect to a longitudinal symmetry plane P along which an inlet 22 and outlet 24 are aligned for the gas flow.

The inlet 22 is embodied in the form of an aperture with a transversal dimension or constant width d and whose largest dimension, namely its height, is contained inside a plane perpendicular to the plane of FIG. 4.

This aperture transforms the gas flow, which traverses it and is marked by the arrow F, into a bidimensional fluid jet (the fluid jet remains almost the same along the direction parallel to the height of the aperture) which oscillates transversally with respect to the longitudinal symmetry plane P.

The fluidic oscillator 20 includes an oscillation chamber 26 into which the gas jet opens via the aperture 22 and in the middle of which an obstacle 28 is positioned and occupying the major portion of said chamber.

The walls of the obstacle 28 together with the walls 26a and 26b of the oscillation chamber 26 define two channels C1 and C2 enabling the gas flow to alternately escape via either channel towards the outlet 24 of the fluidic oscillator.

The obstacle 28 has one front wall 30 opposite the aperture 22, a cavity 32 being made in said obstacle and situated opposite said aperture and which is scavenged by the gas jet during its oscillation movement.

After having struck the cavity, the jet separates into two flows.

In the plane shown on FIG. 4, the cavity 32 has a surface whose profile is able to guide the gas jet inside said cavity during its oscillation.

In order to achieve this, the surface needs to be curved and the cavity must not be too deep otherwise the jet could not guided as far as the bottom of the cavity.

Furthermore, the surface needs to be profiled so as to prevent the creation of a recirculation phenomenon inside the cavity, which would occur if the cavity had obtuse angles on its surface.

The simplest shape is shown on FIG. 4 and corresponds to a half-circle.

However, other shapes are also suitable provided they fulfill the functions mentioned earlier.

For example, the profile of the surface can be parabolic.

The front wall 30 of the obstacle 28 also includes two frontal surfaces 34 and 36 situated symmetrically on both sides of the cavity 32 and are basically flat.

The plane in which these front surfaces are disposed is approximately perpendicular to the longitudinal symmetry plane P and to the direction of the flow at the right of the aperture 22.

However, it is not strictly necessary that these surfaces be disposed inside a given plane, or that the plane of each of them be strictly perpendicular to the symmetry plane P.

The oscillation chamber 26 also includes two walls 26c and 26d which are disposed symmetrically on both sides of the aperture 22 opposite the front surfaces 34 and 36.

The walls 26c and 26d have surfaces parallel to the front surfaces 34 and 36.

The eddies to be formed on both sides of the jet shall be positioned between the front surfaces 345 and 36 and the respective corresponding surfaces of the walls 26c and 26d. These eddies shall therefore develop virtually free between these surfaces.

The shape of the cavity 32 is such that at the points A1 and A2 where said cavity joins the front surfaces 34 and 36, the surface of said cavity is approximately parallel to the longitudinal symmetry plane P.

Thus, the flows originating from the jet, which is separated on encountering the surface of the cavity and which are guided by said surface, flow along a direction approximately parallel to the longitudinal symmetry plane on leaving said cavity.

On the other hand, if the shape of the cavity at the points A1 and A12 widens out; the flow is guided by the surface of the cavity 32 along a direction quite far away from that of the symmetry plane P and the development of these eddies risks being disturbed.

In addition, the fact that the surfaces of the walls 26c and 26d are parallel to the front surfaces and that the flow coming out of the cavity 32 follows a direction approximately perpendicular to these surfaces to avoid communicating to the flow, which strikes said surfaces of the walls 26c and 26d, and gives an angle of incidence too far from normal in relation to these surfaces.

In fact, an angle of incidence too far from normal would result in modifying the size of the eddy positioned between this front surface and the corresponding opposing surface of the wall 26c and 26d.

The obstacle has two lateral walls 38 and 40 respectively in communication with the channels C1 and C2.

These walls 38 and 40 have lateral surfaces, mainly flat, which are approximately parallel to the longitudinal symmetry plane P at the points B1 and B2 where each of them respectively joins one of the corresponding front surfaces 34 and 36.

This makes it possible to clearly define the outgoing direction of the flow and avoid a recirculation flow phenomenon which would risk happening if the angle between the lateral surfaces 38, 40 of the obstacle 28 and the longitudinal direction of the symmetry plane were clearly greater than zero or if the joining zone between one of the lateral surfaces and the corresponding front surface formed a curve.

In these cases, the formation of eddies would also risk being disturbed.

At the points B1 and B2, the joining zone is fully defined and is reproducible during a mass production which accurately fixes the location of the separation edge of the flow at the various steady, transition and turbulent flows.

On the other hand, the position of this flow separation edge varies according to the flow states for, say, a convex joining zone. As a result, since it is difficult to reliably reproduce a convex shape, it would be difficult to obtain an accurate positioning of the separation edge. As shown on FIG. 4, the lateral surfaces of the walls 38, 40 of the obstacle 28, together with the lateral walls 26a and 26 of the chamber 26, define two channel portions parallel to each other.

The obstacle 28 also has a rear wall 42 which faces the outlet 24 of the fluidic oscillator.

This rear wall 42 is defined by a surface approximately perpendicular to the central portion of the longitudinal symmetry plane P.

In fact, so as to avoid creating recirculation zones, this rear surface, which is symmetrical with respect to the plane P, forms a slight convex quarter circle from each of the lateral surfaces of the walls 38, 40 and then forms as far as said plane P a right-hand portion slightly slanted with respect to the front surfaces 34, 36 of the obstacle 28.

The bottom of the cavity 32, which corresponds to the portion of said cavity most distant from the aperture 22, is situated at a distance from said aperture of between 4 and 8$d$ and is equal, for example, to 6.25$d$.

The longitudinal dimension of the obstacle 28 between the bottom of the cavity 32 and the surface of the rear wall 42, still referred to as the minimum thickness, is greater than 0.05$d$ so as to ensure a sufficient mechanical resistance and is less than 2$d$.

The transversal dimension of the cavity 32 is between 2.5 and 6.5$d$ and is equal, for example, to 4.5$d$.

The front surfaces 34, 36 are situated at a longitudinal distance from the aperture 22, that is from the walls 26c and 26d respectively, of between 2.25 and 6.25$d$ and is equal, for example, to 4.25$d$.

The front surfaces 34, 36 have a transverse or width dimension of between 0.25 and 5$d$ and is equal, for example, to 3.25$d$.

By virtue of the simplified form of the fluidic oscillator of the invention, said oscillator is simpler to produce in large quantities and this therefore makes it possible to ensure shape reproductibility and accordingly the repeatability of measurements.

Furthermore, the simplified shape of the fluidic oscillator of the invention has increased resistance concerning the problems of contamination due to the accumulation on the oscillator of dust carried by the gas flow.

The fluidic oscillator of FIG. 4 is able to measure the gas flow (or of another fluid, such as water) which traverses it by means of two pressure tappings situated at the extreme scavenging points of the gas jet inside the cavity 32. These pressure tappings are connected to known devices able to measure the oscillation frequency of the jet. A prior adjustment makes it possible to connect the frequency to the flow.

Thermal or ultrasonic sensors can also be used to measure the oscillation frequency of the jet.

These sensors can also be placed between the aperture 22 and the obstacle 28 in the upper wall (not shown on FIG. 4) which forms a cover to the fluidic oscillator, or even in the lower wall of said fluidic oscillator.

The location of these sensors is indicated by the dotted lines shown on FIG. 4.

The curves shown on FIGS. 5a and 5 show comparable results of the relative error E obtained for the gas flow measurement according to the Reynold's number for the fluidic oscillator of the prior art (FIG. 5a) and of the invention (FIG. 5b).

FIGS. 6a, 6b and 6c represent the fluidic oscillator of FIG. 4 according to the various operating conditions concerning the steady state, transition and turbulent flows.

On each figure, the oscillation of the jet has been represented on the same side so as to facilitate understanding of the phenomenon.

The two main eddies T1 and T2 are situated on both sides of the jet when the latter is oscillating.

Therefore, the comparison of these three figures clearly shows that by increasing the Reynold's number, the radial extension of the main eddy T1 localised between the front surface 34 and the surface 26c increases.

Given the fact that the jet oscillation frequency is proportional to the ratio of the speed of rotation of the eddy on its radial extension, the extension increases and the maximum speed of the jet reduces when the Reynold's number increases, thus rendering the frequency constant.

We claim:

1. Fluidic oscillator, which is symmetrical with respect to a longitudinal symmetry plane, including a fluid inlet intended to form a bidimensional fluid jet oscillating transversally with respect to the symmetry plane, an obstacle in which a cavity is made situated opposite said fluid inlet and which is scavenged by the oscillation jet, characterised in that the obstacle has a front wall including two basically flat front surfaces framing the cavity, the plane of each surface being approximately perpendicular to the symmetry plane, said cavity being defined by a surface approximately parallel to said plane at points where said surface joins each of said front surfaces, the obstacle also having two lateral walls whose lateral surfaces are approximately parallel to the symmetry plane at points where each of them joins the corresponding front surface.

2. Fluidic oscillator according to claim 1, wherein the surface of the cavity is profiled so as to guide the fluid jet into said cavity and prevent the creation of a recirculation phenomenon inside said cavity.

3. Fluidic oscillator according to claim 1, wherein the surface of the cavity has a semi-circular profile inside the oscillation plane of the fluid jet.

4. Fluidic oscillator according to claim 1, wherein the surface of the cavity has an approximately parabolic profile inside the oscillation plane of the fluid jet.

5. Fluidic oscillator according to claim 1 and including an oscillation chamber connected to the fluid inlet and housing said obstacle, said chamber having walls situated opposite the front surfaces on both sides of said fluid inlet and having surfaces approximately parallel to said front surfaces.

6. Fluidic oscillator according to claim 1, wherein the lateral surfaces of the obstacle are basically parallel to the symmetry plane.

7. Fluidic oscillator according to claim 1, wherein the obstacle has a rear wall defined by a rear surface approximately perpendicular to the symmetry plane.

8. Fluidic oscillator according to claim 5, wherein the obstacle occupies the major portion of the oscillation chamber.

9. Fluidic oscillator according to claim 1, wherein the cavity has one portion most distant from the fluid inlet and has a transversal dimension d and which is situated at a distance of between 4 and 8*d* from said inlet.

10. Fluidic oscillator according to claim 1, wherein the transversal dimension of the cavity is between 2.5 and 6.5*d*, d being the transversal dimension of the fluid inlet.

11. Fluidic oscillator according to claim 1, wherein the front surfaces are situated at a longitudinal distance from the fluid inlet with a transversal dimension d of between 2.25 and 6.25*d*.

12. Fluidic oscillator according to claim 1, wherein the longitudinal dimension between the portion of the cavity most distant from the fluid inlet and a rear wall of the obstacle is between 0.05 and 2*d*, d being the transversal dimension of the fluid inlet.

13. Fluidic oscillator according to claim 1, wherein the front surfaces have a transversal dimension of between 0.25 and 5*d*, d being the transversal dimension of the fluid inlet.

* * * * *